US010566114B2

(12) United States Patent
Forget

(10) Patent No.: US 10,566,114 B2
(45) Date of Patent: Feb. 18, 2020

(54) METHOD FOR MOUNTING A SHEATH ON A WIRE HARNESS AND A SET COMPRISING A SHEATH AND A WIRE HARNESS

(71) Applicant: Airbus Operations SAS, Toulouse (FR)

(72) Inventor: Frédéric Forget, Saint Cricq (FR)

(73) Assignee: Airbus Operations SAS (FR)

( * ) Notice: Subject to any disclaimer, the term of this patent is extended or adjusted under 35 U.S.C. 154(b) by 493 days.

(21) Appl. No.: 15/272,601

(22) Filed: Sep. 22, 2016

(65) Prior Publication Data
US 2017/0092391 A1 Mar. 30, 2017

(30) Foreign Application Priority Data
Sep. 29, 2015 (FR) .................... 15 59215

(51) Int. Cl.
H01B 13/012 (2006.01)
H01B 7/00 (2006.01)
(Continued)

(52) U.S. Cl.
CPC ..... *H01B 13/01263* (2013.01); *H01B 7/0045* (2013.01); *H01B 13/01209* (2013.01);
(Continued)

(58) Field of Classification Search
CPC .......... H02G 1/08; H02G 1/081; H02G 1/083; H02G 1/085; H02G 1/16; H02G 3/04; H02G 3/0443; H02G 3/0481; H02G 3/28; H02G 3/38; B60R 16/0215; Y10T 29/49732; Y10T 29/49734; Y10T 29/49735; Y10T 29/53257; H01B 7/0045; H01B 13/0003; H01B 13/012; H01B 13/01209; H01B 13/01218; H01B 13/01263; H01B 13/01272;
(Continued)

(56) References Cited

U.S. PATENT DOCUMENTS 6,494,523 B2 12/2002 Kobayashi
6,653,568 B1 11/2003 Davis
(Continued)

FOREIGN PATENT DOCUMENTS

EP 1 108 621 A2 6/2001
EP 1 312 657 A2 5/2003

OTHER PUBLICATIONS

Search Report FR 15 59215 (dated Aug. 10, 2016).

*Primary Examiner* — Peter Dungba Vo
*Assistant Examiner* — Joshua D Anderson
(74) *Attorney, Agent, or Firm* — Lerner, David, Littenberg, Krumholz & Mentlik, LLP

(57) ABSTRACT

The method for fitting a sheath on a cable harness includes a series of steps including determining the length of sheath to be used, mounting the sheath on a mounting tool of tubular shape, inserting the cable harness into the mounting tool, removing the mounting tool and arranging the sheath around the cable harness, fitting a sheath stop at one of the ends of the sheath, the sheath stop fastening the end of the sheath to the cable harness stretching the sheath over the cable harness so as to extend it and tension it, and fitting a sheath stop at the other one of the ends of the sheath.

17 Claims, 8 Drawing Sheets

(51) Int. Cl.
*H01B 13/08* (2006.01)
*H01B 13/22* (2006.01)
*H01B 13/06* (2006.01)

(52) U.S. Cl.
CPC ....... *H01B 13/0808* (2013.01); *H01B 13/062* (2013.01); *H01B 13/22* (2013.01); *Y10T 29/53126* (2015.01)

(58) Field of Classification Search
CPC ............ H01B 13/01281; H01B 13/062; H01B 13/08; H01B 13/0808; H01B 13/22; H01B 13/26; H01B 13/268; H01B 13/342; H01B 13/344
See application file for complete search history.

(56) References Cited

U.S. PATENT DOCUMENTS

| | | | |
|---|---|---|---|
| 6,698,979 | B1 | 3/2004 | Ambrose |
| 7,433,571 | B2 * | 10/2008 | Kendricks ................. G09F 3/00 385/136 |
| 2005/0198820 | A1 | 9/2005 | Kolberg et al. |
| 2005/0245141 | A1 | 11/2005 | Ifort |
| 2016/0248236 | A1 * | 8/2016 | Kaneko ............... B60R 16/0215 |

* cited by examiner

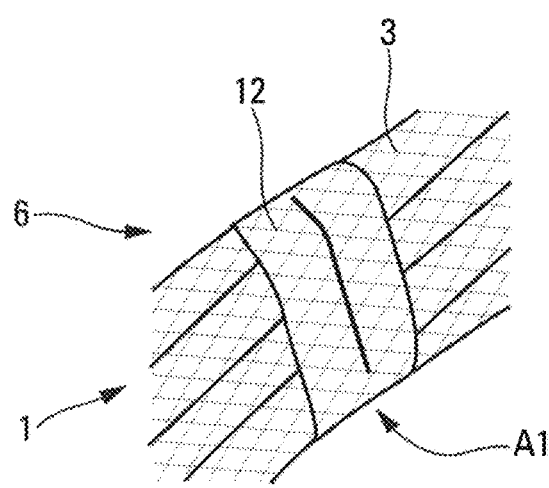
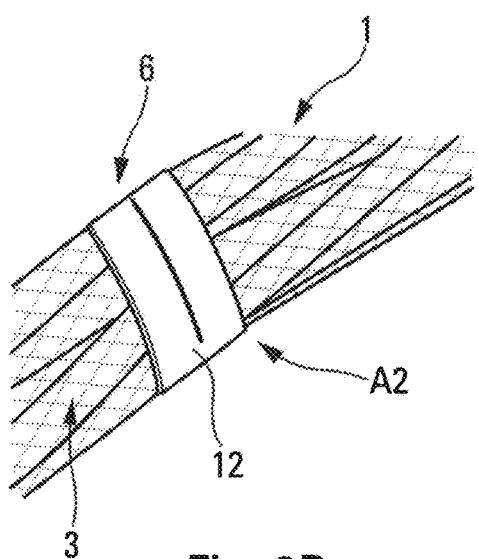
Fig. 8A    Fig. 8B
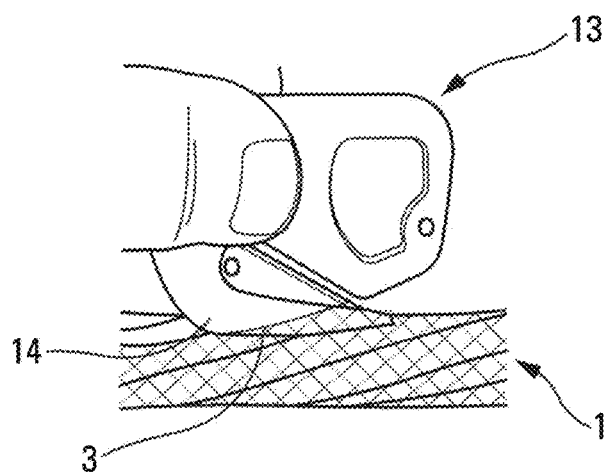
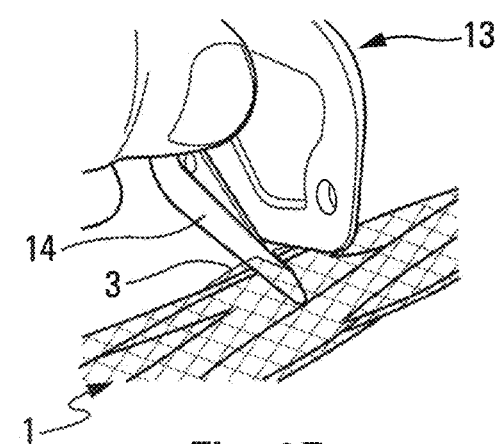
Fig. 9A    Fig. 9B
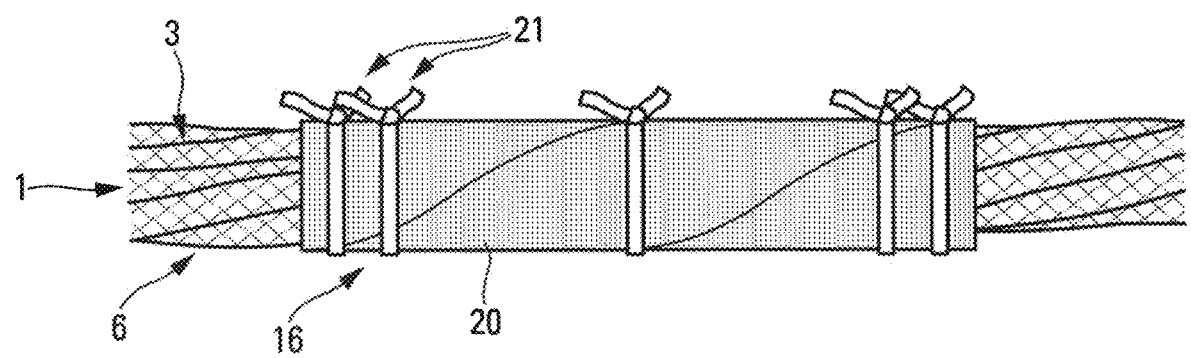
Fig. 10

METHOD FOR MOUNTING A SHEATH ON A WIRE HARNESS AND A SET COMPRISING A SHEATH AND A WIRE HARNESS

FIELD OF THE INVENTION

The present invention relates to a method for fitting a sheath on a cable harness, and to an assembly formed by at least one sheath and a harness in particular for an aircraft.

BACKGROUND OF THE INVENTION

It is known that an aircraft, in particular a transport plane, comprises a significant number of cable harnesses or bundles. In the context of the present invention, a cable harness comprises a plurality of electric wires and/or cables and can notably be intended to transmit electrical control signals or to transmit electrical power. A cable harness can also comprise one or more wire or cable harnesses in addition to or as a complement to cables.

In an aircraft, such a cable harness can be used in different possible routes, for example a power supply route, a communications transmission route, an electrical data transmission route, etc.

Usually, such a cable harness is fastened to the structure of the aircraft by a plurality of conventional clamping and fastening devices. Such a way of fastening the harness directly to the clamping and fastening devices is not optimal since it requires notably the fitting of protective tapes between the device and the harness, in particular so as to avoid damage to the cables of the cable harness. The path followed by the harness is defined by several constraints such as the spacing between the various systems installed in the aircraft and the rules of segregation between two harnesses.

In order to protect the cables of the harness, it is also known practice to wrap them with a sheath in the form of a net, as described for example in the patent U.S. Pat. No. 6,494,523. However, the fitting and fastening of such a sheath exhibit drawbacks.

The patent U.S. Pat. No. 6,494,523 provides clamping means in the form of a collar at the ends of the sheath. These clamping means require a relatively long mounting time and are relatively heavy. Thus, the fitting of this net-like sheath is not optimal.

BRIEF SUMMARY OF THE INVENTION

An aspect of the present invention may remedy this drawback. It relates to a method for fitting a sheath on a cable harness.

According to an aspect of the invention, said method comprises at least the following plurality of steps:
a step of forming the length of sheath to be used;
a step of mounting the sheath on a mounting tool of tubular shape;
a step of inserting the cable harness into the mounting tool;
a step of removing the mounting tool and arranging the sheath around the cable harness;
a step of fitting a sheath stop at one of the ends of the sheath, said sheath stop fastening the end of the sheath to the cable harness;
a step of stretching the sheath over the cable harness so as to extend it and tension it; and
a step of fitting a sheath stop at the other one of the ends of the sheath.

Thus, by virtue of an aspect of the invention, a method for mounting a sheath on a harness is obtained which is particularly successful in terms of cost and mounting time, as specified above.

Advantageously, the step of determining the length of sheath comprises a substep of determining the type of sheath to be used, from a plurality of different types, depending on at least one overall diameter of the cable harness, each type of sheath having a given diameter.

Moreover, advantageously, the step of determining the length of sheath comprises a substep of determining the length C of sheath to be used, with the aid of the following expression:

$$C = A \times (B + 2L)$$

in which:
A is a length of sheath covering one meter of cable harness, said length A depending at least on the diameter of the cable harness and on the type of sheath;
B represents a length of cable harness to be covered; and
L is an additional length corresponding to the length of the sheath stop.

Furthermore, advantageously, the mounting tool comprises a rigid tube having a diameter greater than the diameter of the cable harness.

In a first embodiment, at least one of the steps of fitting a sheath stop at one of the ends of the sheath comprises the following substeps:
a substep of defining a position referred to as the outer end position of the sheath stop and fastening a first adhesive tape at this outer end position;
optionally, a substep of fastening the end of the sheath with the aid of a second adhesive tape, at a given distance from the outer end position in a direction toward the sheath, at a position referred to as the inner end position of the sheath stop;
a substep of unfurling the sheath in a tensioned manner as far as the first adhesive tape and fastening the sheath to the first adhesive tape comprising two adhesive faces;
a substep of fastening a third adhesive tape to the outer face of the sheath longitudinally at the outer end position; and
a substep of mounting a clamping collar on the third adhesive tape.

Advantageously, the third adhesive tape is fastened to the outer face of the end of the sheath so as to completely cover the end of the sheath and to cover a part of the cable harness that is not provided with the sheath.

Moreover, advantageously, at least one of the steps of fitting a sheath stop at one of the ends of the sheath comprises a substep of fastening the end of the sheath with the aid of a second adhesive tape, at a given distance from the outer end position in a direction toward the sheath, at a position referred to as the inner end position of the sheath stop.

Moreover, in a second embodiment, at least one of the steps of fitting a sheath stop at one of the ends of the sheath comprises the following substeps:
a substep of defining a position referred to as the outer end position of the sheath stop and of fastening a first adhesive tape at this outer end position;
a substep of unfurling the sheath in a tensioned manner as far as the first adhesive tape and beyond the first adhesive tape and of fastening the sheath to the first adhesive tape comprising two adhesive faces;

a substep of fastening a second adhesive tape comprising two adhesive faces to the outer face of the sheath longitudinally at the outer end position;

a substep of folding the sheath over the second adhesive tape and fastening it, and of cutting the end which protrudes beyond the second adhesive tape longitudinally toward the inside of the sheath;

a substep of fastening a third adhesive tape to the outer face of the sheath longitudinally at the outer end position; and a substep of mounting a clamping collar on the third adhesive tape.

Moreover, in a particular embodiment, the sheath is fitted on a harness referred to as a multiple harness, this multiple harness being formed by a plurality of individual harnesses, at least one of which is provided with a sheath fitted beforehand.

Furthermore, advantageously, the method comprises an additional step of fastening at least one outer protective sleeve, the outer protective sleeve wrapping around a longitudinal portion of the assembly formed by the cable harness and the sheath.

Furthermore, in a preferred embodiment, the method comprises a plurality of auxiliary steps that form a method for repairing at least one damaged cable of the cable harness that makes up part of the assembly formed by the cable harness and the sheath, the plurality of auxiliary steps comprising:

an auxiliary step of cutting the sheath at the location where the damaged cable is damaged;

an auxiliary step of repairing the damaged cable; and an auxiliary step of fitting sheath stops on either side of the cut.

Advantageously, the auxiliary step of fitting a sheath stop at any one of the ends of the cut comprises a plurality of auxiliary substeps comprising:

an auxiliary substep of determining a position referred to as the outer end position of the sheath stop, starting from the location where the cutting of the sheath has taken place;

an auxiliary substep of determining a position referred to as the inner end position of the sheath;

an auxiliary substep of fastening the end of the sheath with the aid of an adhesive tape at this inner end position;

an auxiliary substep of fully stretching the sheath and of fastening the sheath to the cable harness at the outer end position with the aid of an adhesive tape;

a substep of fastening an additional adhesive tape to the outer face of the sheath at this outer end position; and a substep of mounting a clamping collar on the additional adhesive tape.

The present invention also relates to an assembly formed by at least one sheath and a cable harness, this assembly being obtained by implementing the method for fitting a sheath on a cable harness, as described above.

The present invention relates, moreover, to an assembly formed by at least one sheath and a cable harness, which comprises at least one sheath stop at at least one of the ends of the sheath, the sheath stop comprising a plurality of adhesive tapes and being configured to fasten the sheath to the cable harness.

BRIEF DESCRIPTION OF THE DRAWINGS

The appended figures will make it easy to understand how the invention can be embodied. In these figures, identical references denote similar elements. More particularly:

FIGS. 8A and 8B show variant arrangements of an indicator tape;

FIGS. 9A and 9B show variant ways of cutting a sheath;

FIG. 10 schematically shows a portion of an assembly formed by a harness and a sheath, which is provided with a protective sleeve;

DETAILED DESCRIPTION

The present invention applies to a cable harness, and more particularly, although not exclusively, to a cable harness which is mounted on an aircraft, and notably on a transport plane.

The cable harness comprises a cable or wire, and preferably a plurality of cables or wires, intended to transmit an electric current. In the scope of the present invention, this cable harness can be used for transmission along one of a plurality of different conventional paths.

Figure 1:
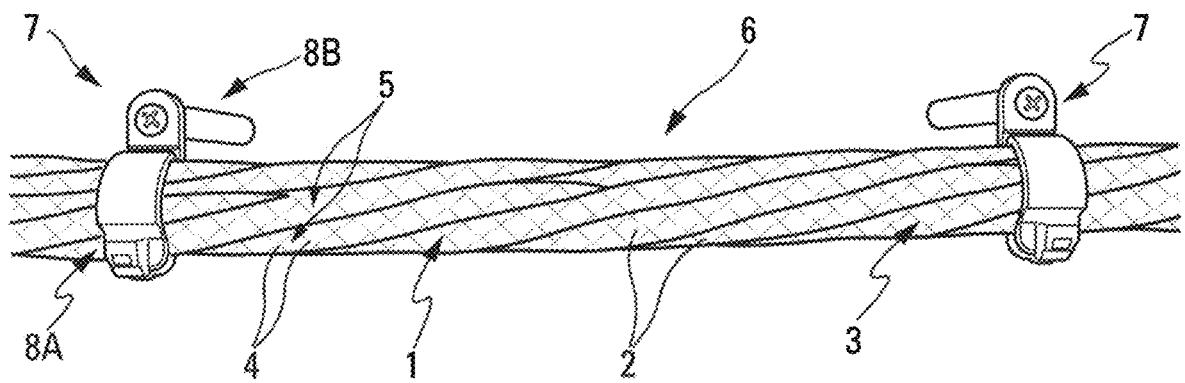
FIG. 1 shows, in plan view, an assembly formed by a cable harness and a sheath wrapping around the cable harness.

A cable harness 1 (known as "harness" below) therefore generally comprises a plurality of cables 2 which are grouped together in a conventional manner, for example being slightly twisted, as shown in FIG. 1.

The present invention relates notably to the fitting of a net-like sheath 3 (known as "sheath" below), such as an extensible braid from the Expando® range offered by Federal-Mogul, around such a harness 1. Of course, the present invention is not limited to net-like sheaths; any type of expandable and transparent flexible protector, the mechanical properties of which are ensured under use conditions, can be used.

The sheath 3 is provided with a net (or netting) formed of meshes 5. The sheath 3 can be folded and extended to a greater or lesser extent. When it is extended, the sheath 3 has the shape of a jacket, in the form of a tube, which is made up exclusively of the net. When it is folded, the sheath 3 can be shorter, with a relatively short length.

The meshes 5 of the net can be made of different materials, in particular of a material that has a degree of flexibility and is resistant to the use conditions (corrosive nature of the fluids, temperature and temperature variation of the surroundings, etc.). The size of the meshes 5 is variable and depends in particular on the characteristics, for example the diameter, of the harness 1 to be wrapped.

In a preferred embodiment, each thread 4 that forms a mesh 5 is made up of a plurality of individual strands which are, for example, braided together. A thread can also be formed by a single strand.

When it is mounted on the harness 1, the sheath 3 makes it possible, notably, to reduce the risks of damage to the cables 2 of the harness 1.

The sheath 3 also provides a function of holding the cables 2 of the harness 1. Thus, it is not necessary to provide conventional means for holding together the different cables inside the sheath 3. Depending on the type of harness to be covered, use can be made of sheaths that have different characteristics, notably rigidity characteristics.

In addition, such a sheath 3 allows visual inspection of the harness 1, for example to detect a defect, such as wear or damage to a cable 2.

FIG. 1 shows an assembly 6 formed by the harness 1 and the sheath 3. This assembly 6 is fastened, in a conventional manner, to a structure (not shown), for example of an aircraft, with the aid of conventional fastening elements 7.

In one particular embodiment, a fastening element 7 comprises a collar 8A that supports the assembly 6 and is secured to a screw 8B (or some other means) which is fastened to the structure.

Figure 2A:
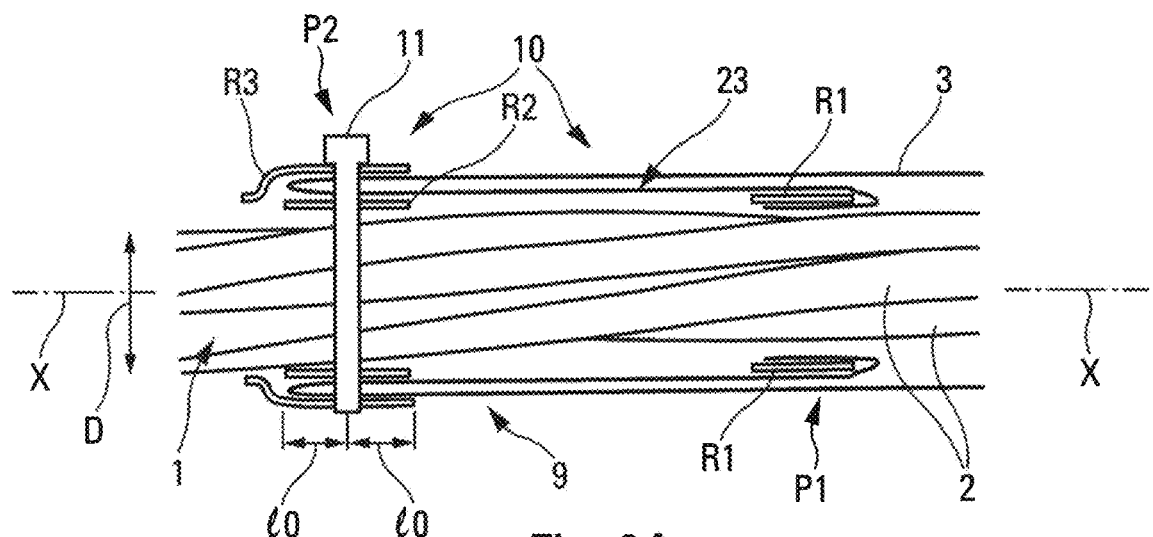
FIGS. 2A and 2B show, in schematic longitudinal section and in plan view, respectively, a part of the assembly formed by a cable harness and a sheath, comprising a sheath stop at one sheath end.

In FIGS. 1 and 2A, the harness 1 is shown over a rectilinear portion in which the overall shape of the harness 1 is tubular. The tube has a central longitudinal axis X-X and an overall diameter D (FIG. 2A).

Figure 2B:
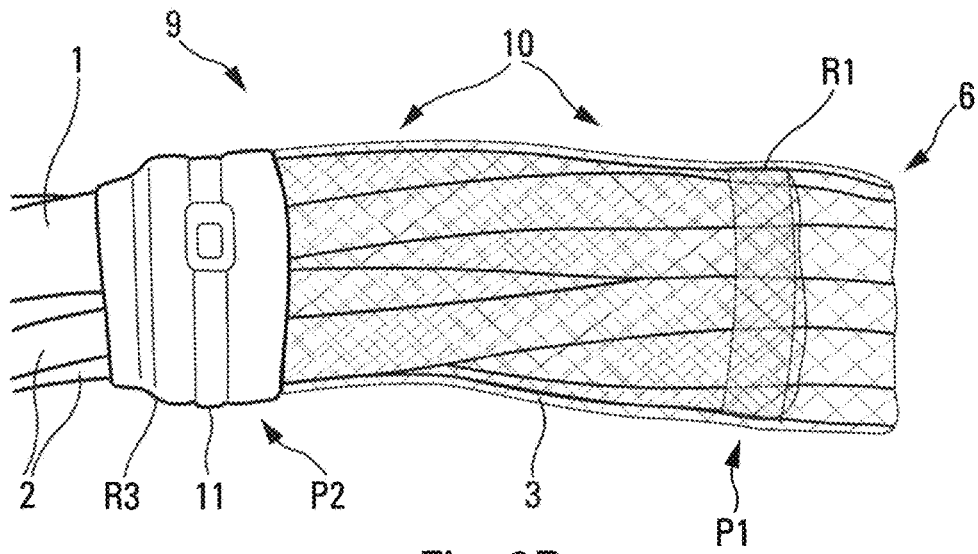

FIGS. 2A and 2B show one end 9 of the sheath 3, which is fastened to the harness 1. This end 9 comprises a sheath stop 10 that makes up a fastening region. This sheath stop 10 comprises a turnback 23 of the sheath 3 longitudinally toward the inside of said sheath 3, and a fastener using an adhesive tape R1 at a position referred to as the inner end position P1. In addition, the opposite end is fastened with the aid of adhesive tapes R2 and R3 and, preferably, a clamping collar 11, at a position referred to as the outer end position P2 (namely longitudinally toward the outside of the sheath 3). The adhesive tapes R1, R2 and R3 can be sticky tapes or self-amalgamating tapes made of silicone.

The fitting of the various elements of this sheath stop 10 is described in more detail below, with reference to FIGS. 6A to 6E.

A method for fitting a sheath 3 on a harness 1 will now be described.

Figure 3:
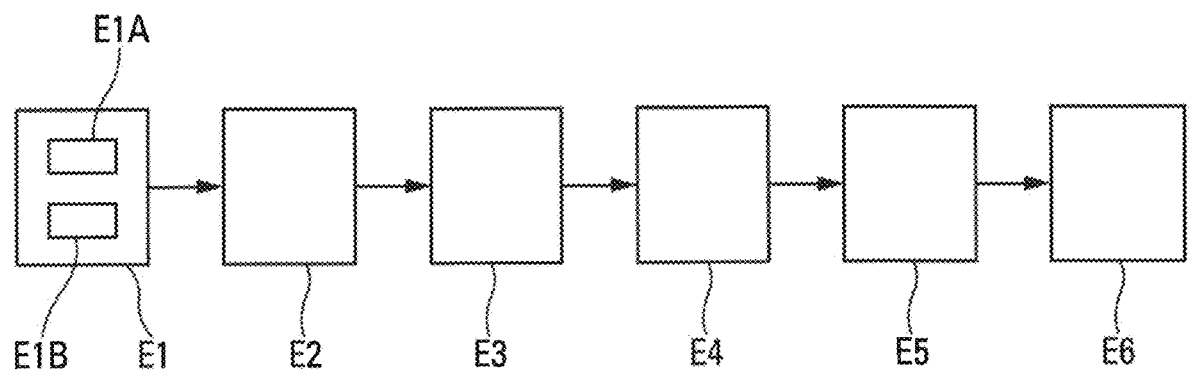
FIG. 3 is the block diagram of the successive steps in a method for fitting a sheath on a cable harness.

This method exhibits a succession of steps E1 to E6, as illustrated in FIG. 3.

The first step E1 comprises a first substep E1A which consists in determining the length of the sheath 3 to be used, depending notably on the diameter D of the harness 1 (FIG. 2A) and the length of harness 1 to be covered. Preferably, the length C of sheath to be used is determined from the following expression:

$$C = A \times (B + 2L)$$

in which:
A is the length of sheath which covers one meter of harness 1. This length A depends at least on the diameter D of the harness 1 and on the type of sheath 3 used. Preferably, this length A is taken from a predetermined table;
B represents the length of harness 1 to be covered effectively; and
L is an additional length corresponding to the length of the sheath stop 10.

By way of illustration:
for a harness 1 with a diameter D of 10 mm, the length A can be 1.16 m; and
for a harness 1 with a diameter D of 20 mm, the length A can be 1.35 m.

Once the length C of the sheath 3 has been defined, an operator cuts a sheath of this length C from a sufficiently long net, in a substep E1B. To this end, the operator can use a pair of scissors. However, he will preferably use a thermal cutting element which makes it possible to produce a straight and clean cut.

Figure 4A:
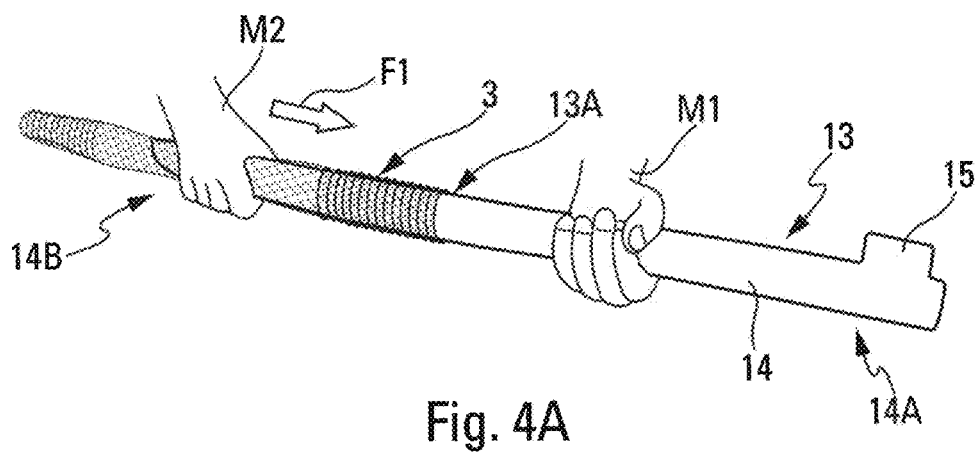
FIGS. 4A to 4D show, in more detail, different steps in the method for fitting the sheath on the cable harness.

The following step E2 consists in mounting the sheath 3 on a mounting tool 13, as shown in FIG. 4A.

The mounting tool 13 preferably comprises a tube 14, for example made of plastic, that is relatively rigid. This tube 14 has a diameter greater than the diameter D of the harness, so that the harness can be inserted into said tube 14, as specified below.

In this step E2, the operator threads the sheath 3 onto the outer surface 13A of the mounting tool 13. One 14B of the ends 14A and 14B of the mounting tool 13 has a conical shape so as to make it easier to thread the sheath 3 onto the outer surface 13A of the mounting tool 13. The end 14B is provided with a protruding tab 15 that can serve as an indicator holder.

As shown in FIG. 4A, the operator holds the mounting tool 13 with one hand M1 and threads the sheath 3 in the direction illustrated by an arrow F1 with his other hand M2.

Figure 4B:
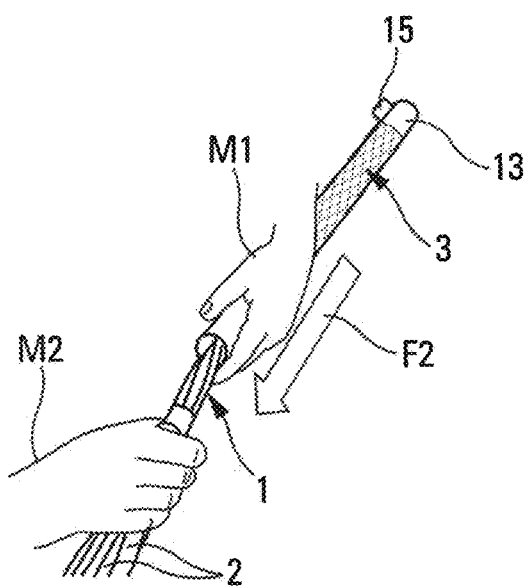

The following step E3 consists in introducing the harness 1 into the mounting tool 13. To this end, the operator holds the mounting tool 13 with one hand M1 and the harness 1 with the other hand M2. He inserts the harness into the mounting tool, or he threads the mounting tool 13 onto the harness 1, as illustrated by an arrow F2 in FIG. 4B.

The following step E4 consists in removing the mounting tool 13 with the sheath 3 being arranged around the harness 1.

Figure 4C:
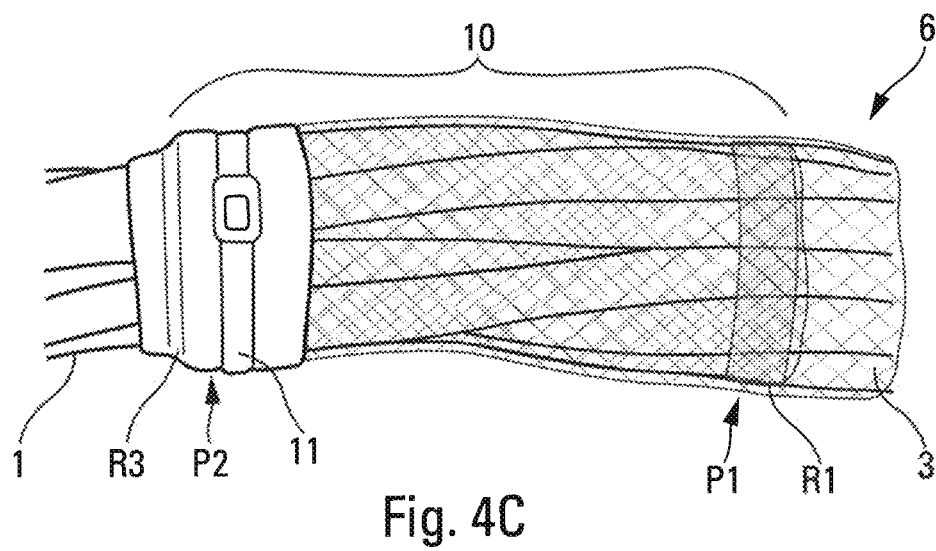

As for the following step E5, it consists in fitting a sheath stop 10 at one of the ends of the sheath 3, on the harness 1, as shown in FIG. 4C. This step E5 is described in detail below, with reference to FIGS. 6A and 6E.

Figure 4D:
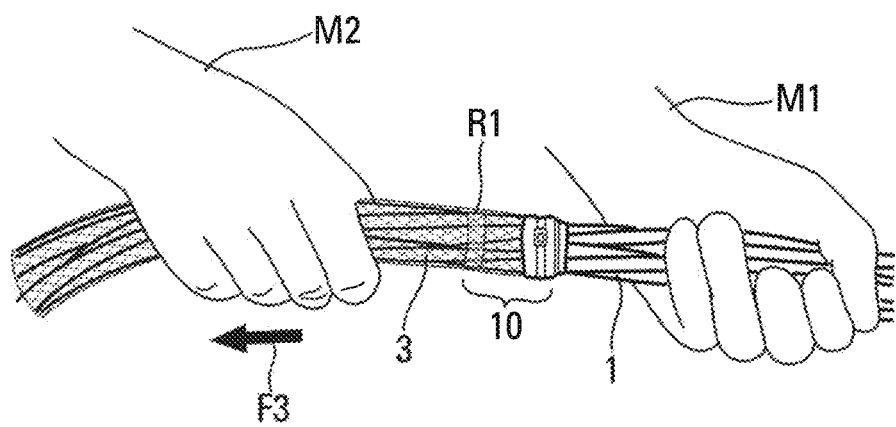

The following step E6, for its part, consists in stretching the sheath 3 over the harness 1, as shown in FIG. 4D.

More specifically, the operator holds the harness 1 with one hand M1 and, by moving the other hand M2 (grasping the sheath 3) as shown by an arrow F3, he stretches the sheath 3 along the harness 1 to be covered. To do this, it is recommended that protective gloves be used.

The following step E7 consists in fitting a sheath stop 10 at the other end of the sheath 3, on the harness 1, as shown in FIG. 4C. This step E7, which is similar to step E4, is described in detail below, with reference to FIGS. 6A to 6E.

The two end stops 10 make it possible to keep the sheath 3 sufficiently tensioned and clamped. Thus, the cables 2 that make up the harness 1 are held correctly, in a clamped manner, without the appearance of bulging or slackening.

The above-described fitting of the sheath 3 on the harness 1 is simple and easy and makes it possible to reduce the mounting time compared with conventional mounting.

Figure 5:
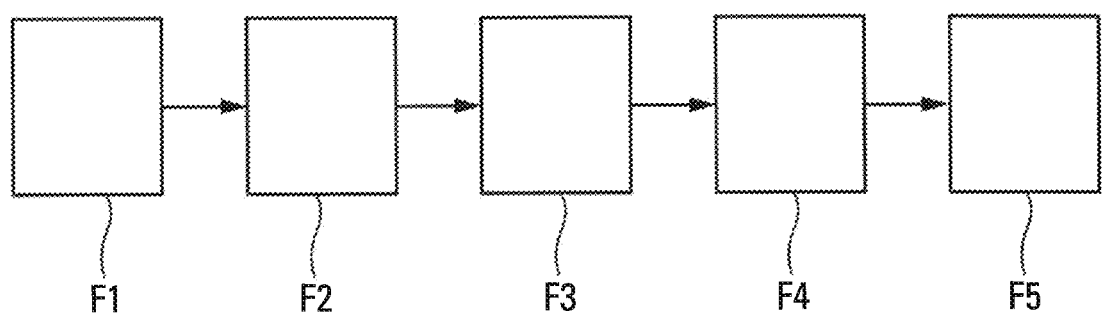
FIG. 5 is the block diagram of the successive steps in a method for fitting a sheath stop.

A first method for the fitting of a sheath stop 10 by an operator will now be described with reference to FIGS. 6A to 6E. This fitting method comprises a succession of substeps F1 to F5, as illustrated in FIG. 5.

Figure 6A:
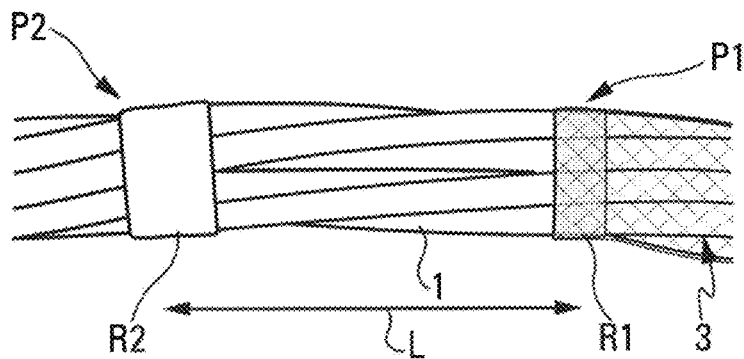
FIGS. 6A to 6E show, in more detail, different steps in the method for fitting the sheath stop.

The first substep F1 consists in defining the outer end position P2 of the sheath stop and in fastening a first adhesive tape R2 at this outer end position P2 (longitudinally toward the outside with respect to the sheath 3 when the sheath is in position), as shown in FIG. 6A.

The following substep F2 consists in fastening the end of the sheath 3 with the aid of a second adhesive tape R1 (provided with one adhesive face) at a given distance L from the outer end position P2 in a direction toward the sheath 3, at the inner end position P1 of the sheath stop, as also shown in FIG. 6A.

Figure 6B:
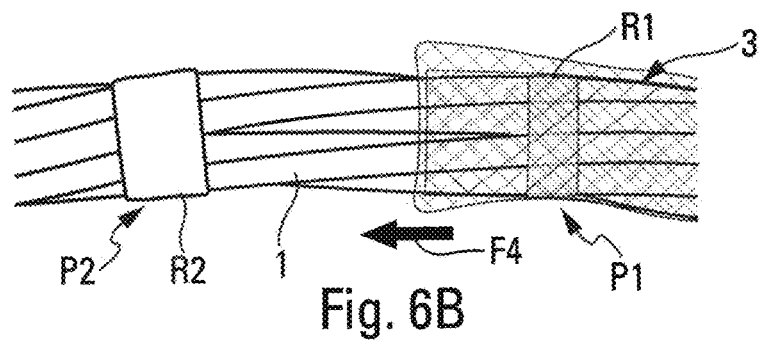
Figure 6C:
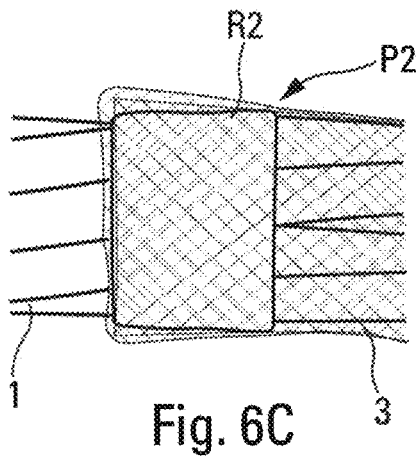

As for the following substep F3, it consists in unfurling the sheath 3 in a tensioned manner as far as the adhesive tape R2, passing it over the adhesive tape R1, as illustrated by an arrow F4 in FIG. 6B, and in subsequently fastening the sheath 3 to the tape R2, which has two adhesive faces, as shown in FIG. 6C.

Figure 6D:
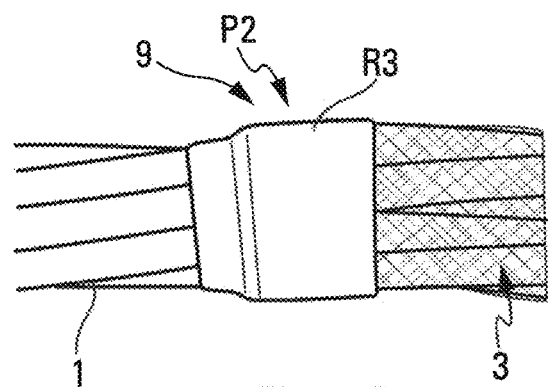

The following substep F4 consists in fastening an adhesive tape R3 (provided with one adhesive face) to the outer face of the end 9 of the sheath 3 at the adhesive tape R2, that is to say longitudinally at the outer end position P2, as shown in FIG. 6D.

The adhesive tape R3 is fitted so as to completely cover the end of the sheath and to cover a part of the harness, so as to obtain good adhesion and to properly cover the entire end of the sheath.

Figure 6E:
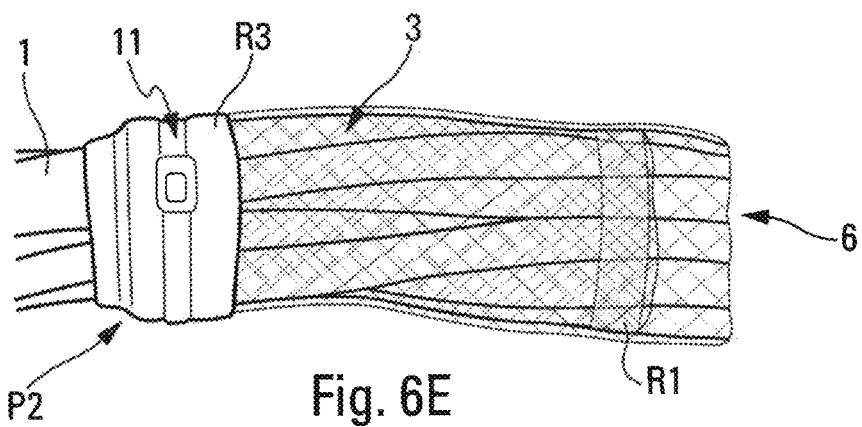

The following substep F5 consists in mounting a conventional clamping collar 11 on the adhesive tape R3, as shown in FIG. 6E.

This first method for fitting a sheath stop 10 makes it possible to create a store of sheath having a length identical to L.

In a variant embodiment of the first method for fitting a sheath stop 10, the first adhesive tape R2 used in substep F1 is provided with two adhesive faces. Thus, in substep F2, the end of the sheath 3 is fastened to the adhesive tape R2 at the outer end position P2 before the sheath 3 is unfurled along the harness 1 in substep F3 and before the end of the sheath 3 is then covered, in substep F4, by the third adhesive tape R3.

The clamping collar 11 is preferably centered longitudinally with respect to the inner adhesive tape R2, as illustrated in FIG. 2A with lengths 10.

A second (preferred) method for the fitting of a sheath stop 10 by a user will now be described. This fitting method comprises a succession of substeps H1 to H6 (not shown).

The first substep H1 consists in defining the outer end position P2 of the sheath stop and in fastening a first adhesive tape, such as the adhesive tape R2 in FIG. 6A, at this outer end position P2 (longitudinally toward the outside with respect to the sheath 3 when the sheath is in position).

The following substep H2 consists in unfurling the sheath 3 in a tensioned manner as far as the first adhesive tape and beyond said first adhesive tape, passing it over said first adhesive tape, and then in fastening the sheath 3 to this first adhesive tape which has two adhesive faces.

The following substep H3 consists in fastening a second adhesive tape (provided with two adhesive faces) to the outer face of the sheath 3 at the first adhesive tape, that is to say longitudinally at the outer end position P2.

The following substep H4 consists, for its part, in folding the sheath 3 over this second adhesive tape and then in fastening the sheath 3 to this second adhesive tape which has two adhesive faces. Substep H4 also consists in cutting the end which protrudes beyond this second adhesive tape longitudinally toward the inside of the sheath.

Moreover, the following substep H5 consists in fastening an adhesive tape (provided with one adhesive face) to the outer face of the sheath 3 at the first and second adhesive tapes, that is to say longitudinally at the outer end position P2.

The third adhesive tape is fitted so as to completely cover the end of the sheath and to cover a part of the harness, so as to obtain good adhesion and properly cover the entire end of the sheath.

Finally, the last substep H6 consists in mounting a conventional clamping collar on the third adhesive tape, in the same way for example as for the clamping collar 11 on the adhesive tape R3 in FIG. 6E.

In one particular embodiment, the sheath 3B can also be fitted on a harness 1B known as a multiple (or global) harness. This multiple harness 1B is formed by a plurality of individual harnesses 1A and 1C, at least one 1A of which has already been provided with an individual sheath 3A, as shown in FIGS. 7A to 7C.

Preferably, this sheath 3A and notably the corresponding sheath stop 10A have been fitted in the manner described above.

Figure 7A:
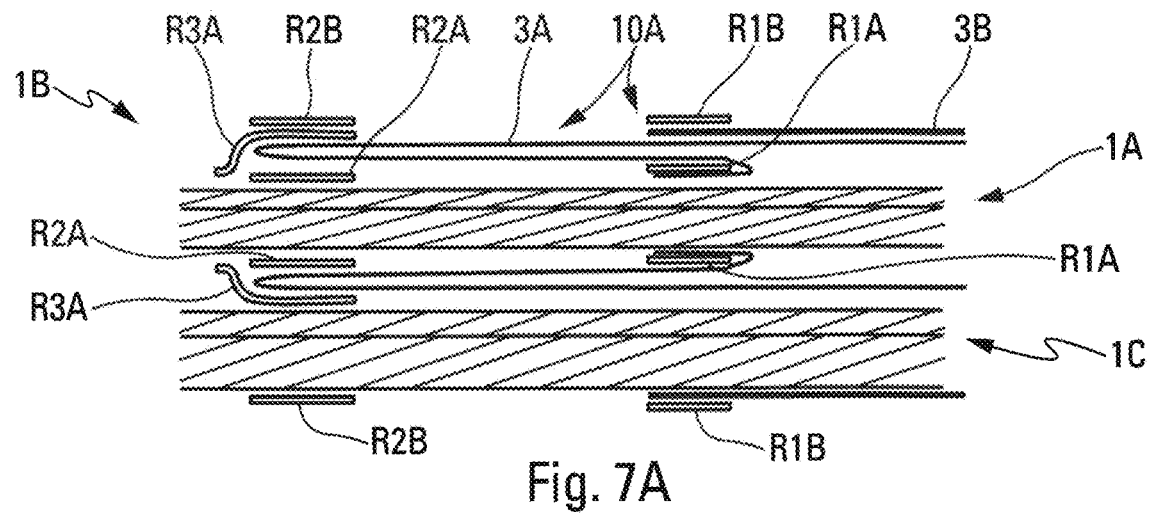
FIGS. 7A to 7C show successive steps in a method for fitting a sheath on a multiple harness provided with a plurality of individual harnesses.
Figure 7B:
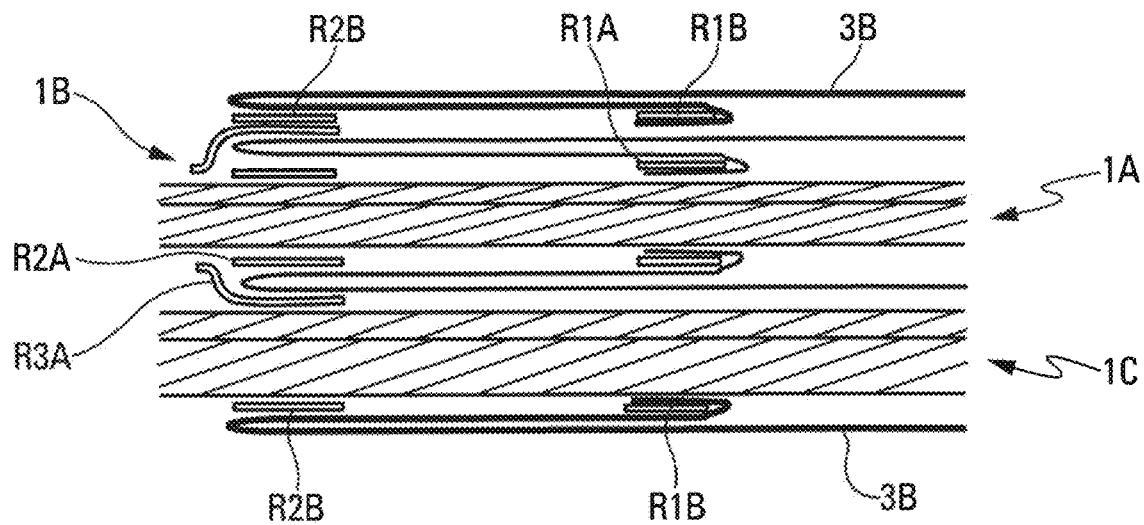
Figure 7C:
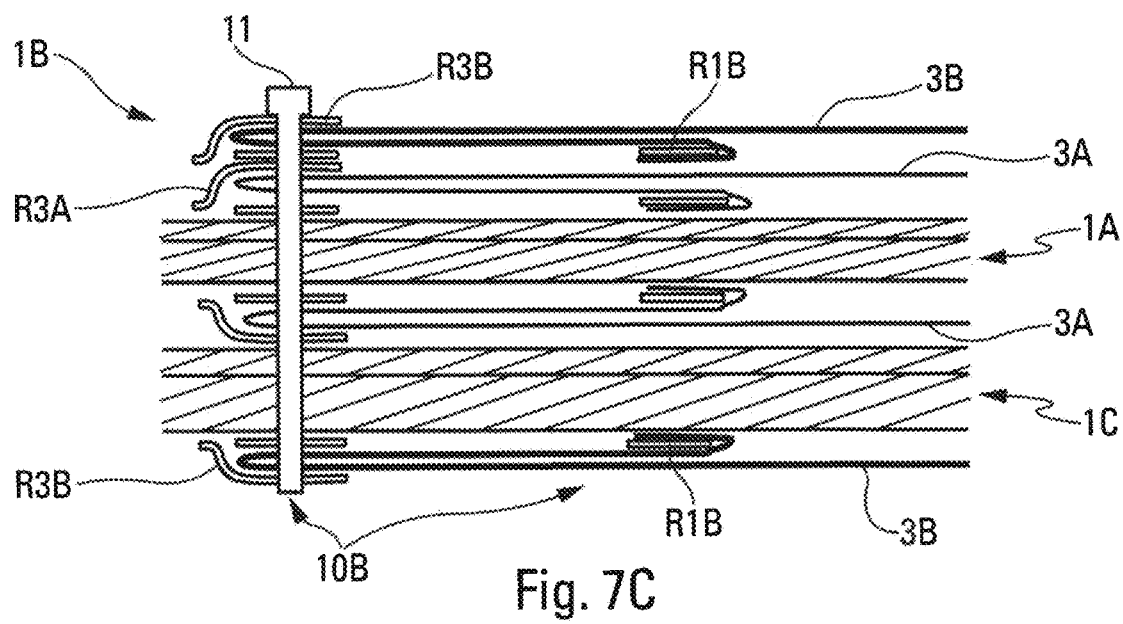

In FIGS. 7A to 7C, the references relating to the individual harness 1A and its sheath 3A include the letter "A" and the references relating to the multiple harness 1B and its sheath 3B include the letter "B". In the example in FIGS. 7A to 7C, the multiple harness 1B comprises:
- the harness 1A provided with the sheath 3A, for example for a route intended for flight control on an aircraft. This sheath 3A has been fitted in the manner indicated above, but its stop end 10A does not comprise a clamping collar; and
- the harness 1C without a sheath, for example for a power transmission route on an aircraft.

In this case, an operator first of all wraps the multiple harness 1B with two adhesive tapes R1B and R2B similar to the tapes R1 and R2 in FIG. 6A, as shown in FIG. 7A.

Next, the operator fits the sheath 3B in the manner described above with reference to FIGS. 6B and 6C so as to obtain the arrangement shown in FIG. 7B.

Finally, he arranges an outer tape R3B which covers the complete end as in FIG. 6D, and a clamping collar 11 (FIG. 7C), which is mounted as indicated above with reference to FIG. 6E.

In this way, both individual holding of the harness 1A and collective holding of the harnesses 1A and 1C is obtained.

In one particular embodiment, at least one indicator tape 12 is additionally fastened to the assembly 6 formed by the harness 1 and the sheath 3. This indicator tape 12 can, notably, be used to indicate the date.

In a first embodiment A1, shown in FIG. 8A, the indicator tape 12 of adhesive type is fastened directly to the harness 1 before the sheath 3 is fitted. In this case, the indicator tape 12 is arranged between the harness 1 and the sheath 3. On account of the netlike structure of the sheath 3, the indications marked on the indicator tape 12 are clearly legible.

Moreover, in a second embodiment A2, shown in FIG. 8B, the indicator tape 12 of adhesive type is fastened to the sheath 3 after it has been fitted on the harness 1.

The sheath 3, as described above, can be easily removed at least in part, for example in the event of damage to a cable, simply by making a cut.

This cut is preferably made with the aid of a tool 13 provided with a cutting blade 14, such as a cutter, the shape of which is designed (for example by being rounded) so as not to damage the harness 1.

FIG. 9A shows longitudinal cutting of the sheath 3 (in the overall longitudinal direction X-X (FIG. 2A) of the harness 1), while FIG. 9B shows transverse cutting, substantially perpendicularly to the overall longitudinal direction of the harness 1.

Such a cut is generally made to open the sheath 3 so as to access the cables, in particular during a repair, as described below.

Furthermore, in one particular embodiment, shown in FIG. 10, the assembly 6 formed by the harness 1 and the sheath 3 which covers it can be protected by an outer protective sleeve 20 which is fastened to the outside of the sheath 3 along a longitudinal portion 16 and wraps around the assembly 6. In the example in FIG. 10, the means 21 used for fastening the protective sleeve 20 are shown schematically. In one variant embodiment, this sleeve is longitudinally slit.

This protective sleeve 20 may for example be made of aramid fiber and be fastened to a sensitive portion 16 of the assembly 6, which is likely for example to be subjected to friction, so as to form localized protection.

Figure 11:
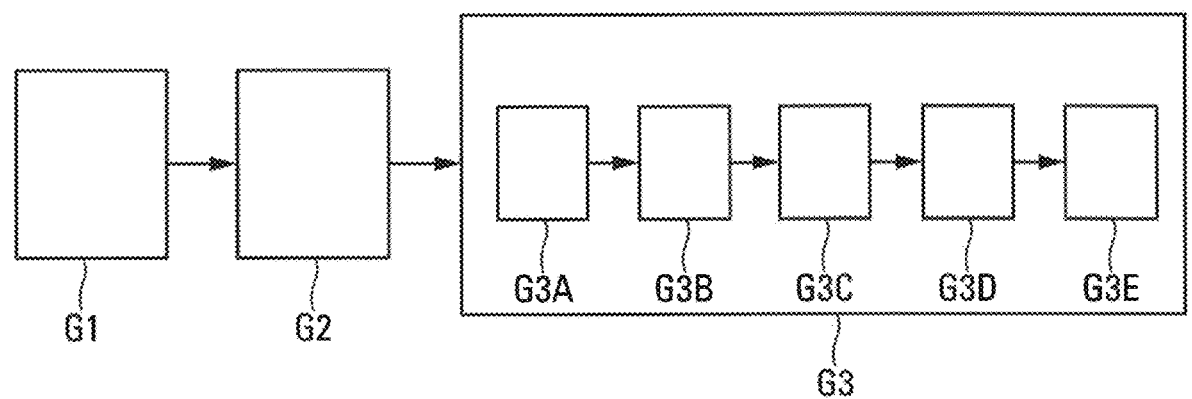
FIG. 11 is the block diagram of the successive steps in a method for repairing a cable which makes up part of an assembly formed by a cable harness and a sheath.

A method for repairing an assembly 6 formed by a cable 2 harness 1 and a sheath 3, notably for repairing a damaged cable 2A, will now be described with reference to FIGS. 12A to 12G. This repair method comprises a succession of auxiliary steps G1, G2 and G3, as shown in FIG. 11.

Figure 12A:
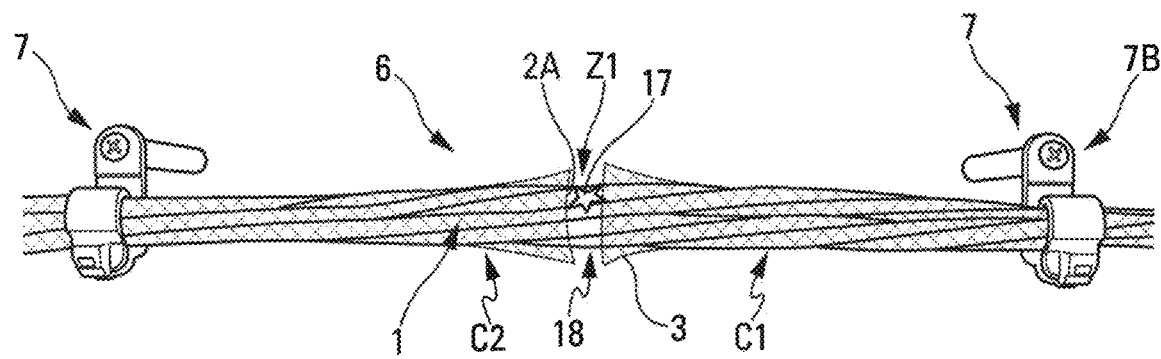
FIGS. 12A to 12G show, in more detail, different steps in the method for repairing a cable.

In the example in FIG. 12A, an assembly 6 formed by a harness 1 and a sheath 3, which is fastened to a structure (not shown) by way of conventional fastening means 7, is shown. It turns out that a cable 2A of the cable harness 1, which is provided with the sheath 3 as described above, is damaged in a region Z1 as illustrated by a symbol 17.

To repair this cable 2A, an operator first of all cuts the sheath 3, in auxiliary step G1, in the manner shown in FIG. 9B, so as to obtain a complete peripheral cut 18 of the sheath 3 in the region Z1, as can be seen in FIG. 12A.

Figure 12B:
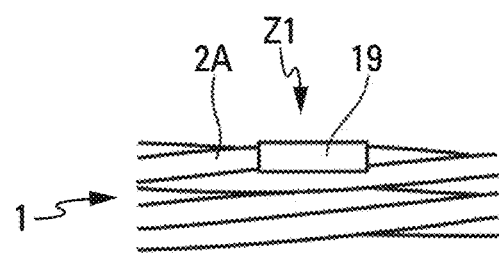

After making this cut, the operator repairs the cable 2A, in the conventional manner, in auxiliary step G2, notably by wrapping it in the region Z1 with a sheath or protective tape 19, as shown in FIG. 12B.

After making this repair, in the following auxiliary step G3, the operator positions sheath stops 10 at the two ends C1 and C2 of the cut 18, on either side of the region Z1 (FIG. 12A). This auxiliary step G3 comprises a plurality of auxiliary substeps G3A to G3E (FIG. 11) that are described below with reference to FIGS. 12C to 12G.

In FIGS. 12A and 12C to 12G, the two fastening elements 7, at 7A and 7B, can be distinguished so as to help in the visual localization of the various operations carried out.

Figure 12C:
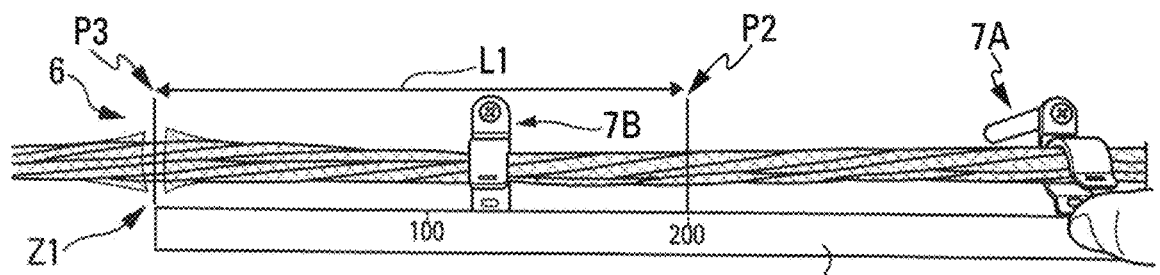

The first auxiliary substep G3A consists in first of all determining the outer end position P2 of the sheath stop, from the location P3 (in the region Z1) where the cutting 18 has taken place. By way of example, a distance L1 of 200 mm from the region Z1 can be provided to obtain the outer end position P2, as shown in FIG. 12C in which a meter 22 subdivided into millimeters is shown.

Figure 12D:
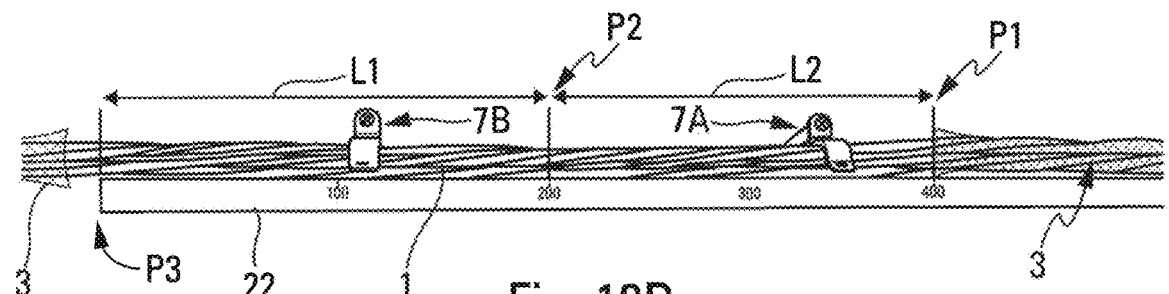

The operator then determines, in the following auxiliary substep G3B, the inner end position P1 of the sheath stop, by doubling the length measured between the positions P3 and P2 (L1+L2=2L1), as shown in FIG. 12D.

Figure 12E:
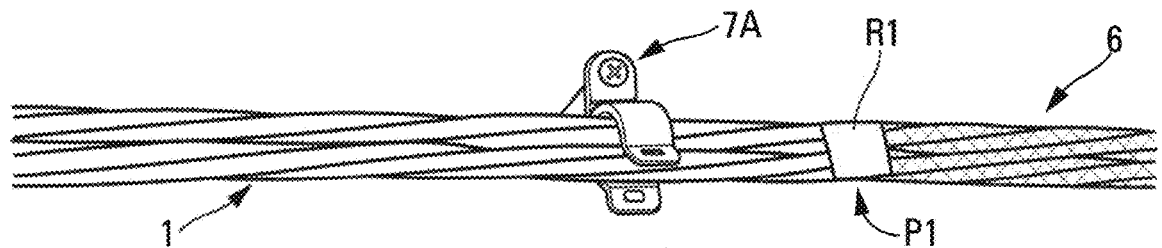

In the following auxiliary substep G3C, the operator fastens an adhesive tape R1 at this inner end position P1, for example by wrapping an adhesive so as to form two layers of adhesive tape, as shown in FIG. 12E.

Figure 12F:
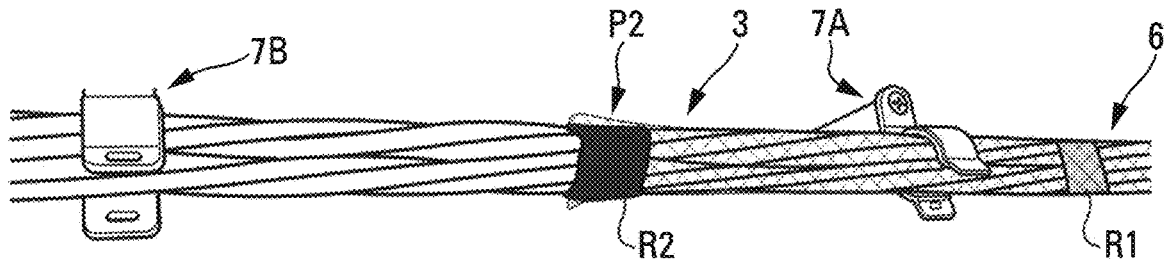

Next, in the following auxiliary substep G3D, the operator fully stretches the sheath 3 and fastens the sheath 3 to the harness 1 at the outer end position P2 with the aid of an adhesive tape R2, as shown in FIG. 12F.

Next, in the following auxiliary substep G3E, the operator fastens an adhesive tape R3 to the outer face of the sheath 3 at the outer end position P2, and he fits a clamping collar 11 on the adhesive tape R3.

Figure 12G:
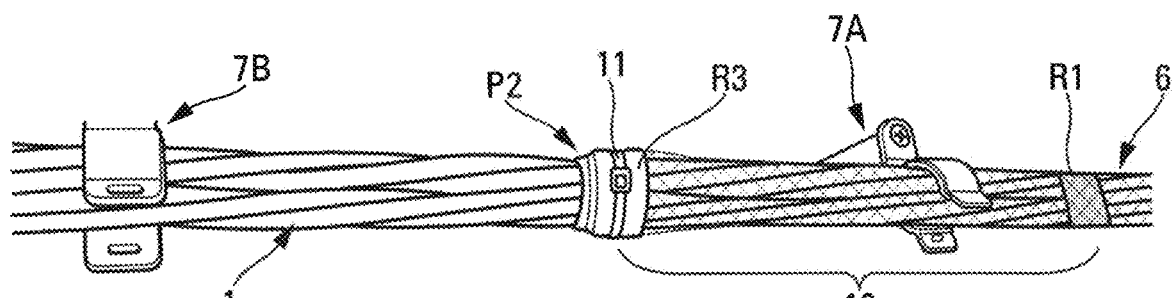

This makes it possible to obtain the sheath stop 10 shown in FIG. 12G on one side C1 of the repair region Z1 (FIG. 12A).

In a similar manner, the operator then carries out auxiliary substeps G3A to G3E on the other side C2 of this repair region Z1 (FIG. 12A), in order to complete the repair.

Furthermore, when the sheath 3 is damaged:
as long as a number of threads 4 (forming the meshes 5) less than a given number, for example four, is not cut at one and the same location, the sheath is not repaired at this location;
otherwise, the sheath is cut perpendicularly to the longitudinal direction at this location and the abovementioned method for fitting the sheath stop is carried out on both sides of this cut.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for fitting a sheath on a cable harness, the method comprising:
   determining a length of the sheath to be used;
   mounting the sheath on a mounting tool of tubular shape;
   inserting the cable harness into the mounting tool;
   removing the mounting tool and arranging the sheath around the cable harness;
   fitting a first sheath stop at a first end of the sheath, said first sheath stop fastening the first end of the sheath to the cable harness;
   stretching the sheath over the cable harness so as to extend the sheath and tension the sheath; and
   fitting a second sheath stop at a second end of the sheath,
   wherein the determining the length of sheath comprises determining the length C of sheath to be used, with the aid of the following expression:

$$C = A \times (B + 2L)$$

in which:
   A is a length of sheath covering one meter of cable harness, said length A depending at least on a diameter of the cable harness and on the type of sheath;
   B represents a length of cable harness to be covered; and
   L is an additional length corresponding to the length of the one of the first and second sheath stops.

2. The method as claimed in claim 1, wherein the determining the length of sheath comprises determining a type of sheath to be used, from a plurality of different types, depending on at least one overall diameter of the cable harness, each type of sheath having a given diameter.

3. The method as claimed in claim 1, wherein the mounting tool comprises a rigid tube having a diameter greater than a diameter of the cable harness.

4. The method as claimed in claim 1, wherein at least one of the steps of fitting the first sheath stop and fitting the second sheath stop comprises:
   defining a position referred to as an outer end position of a corresponding one of the first sheath stop and the second sheath stop and fastening a first adhesive tape at the outer end position;
   unfurling the sheath in a tensioned manner as far as the first adhesive tape and beyond the first adhesive tape and fastening the sheath to the first adhesive tape comprising two adhesive faces;
   fastening a second adhesive tape comprising two adhesive faces to an outer face of the sheath longitudinally at the outer end position;
   folding the sheath over the second adhesive tape and fastening the sheath, and cutting an end which protrudes beyond the second adhesive tape longitudinally toward an inside of the sheath;
   fastening a third adhesive tape to an outer face of the sheath longitudinally at the outer end position; and
   mounting a clamping collar on the third adhesive tape.

5. The method as claimed in claim 1, wherein the sheath is fitted on a harness referred to as a multiple harness, the multiple harness being formed by a plurality of individual harnesses, at least one of which is provided with a sheath fitted beforehand.

6. The method as claimed in claim 1, further comprising fastening at least one outer protective sleeve, the outer protective sleeve wrapping around a longitudinal portion of the assembly formed by the cable harness and the sheath.

7. The method as claimed in claim 1, further comprising a method for repairing at least one damaged cable of the cable harness that makes up part of the assembly formed by the cable harness and the sheath, the method for repairing comprising:
   cutting the sheath at the location where the damaged cable is damaged;
   repairing the damaged cable; and
   fitting the sheath stop and the second sheath stop on either side of the cut.

8. The method as claimed in claim 7, wherein at least one of the fitting the first sheath stop and the second sheath stop at any one of ends of the cut comprises:
   determining a position referred to as the outer end position of corresponding one of the first sheath stop and the second sheath stop, starting from the location where the cutting of the sheath has taken place;
   determining a position referred to as an inner end position of the sheath;
   fastening an end of the sheath with the aid of an adhesive tape at the inner end position;
   fully stretching the sheath and of fastening the sheath to the cable harness at the outer end position with the aid of an adhesive tape;
   fastening an additional adhesive tape to the outer face of the sheath at the outer end position; and
   mounting a clamping collar on the additional adhesive tape.

9. The method as claimed in claim 1, wherein at least one of fitting the first sheath stop and fitting the second sheath stop comprises:
   defining a position referred to as an outer end position of a corresponding one of the first sheath stop and the second sheath stop and fastening a first adhesive tape at the outer end position;
   unfurling the sheath in a tensioned manner as far as the first adhesive tape and fastening the sheath to the first adhesive tape comprising two adhesive faces;
   fastening a third adhesive tape to an outer face of the sheath longitudinally at the outer end position; and
   mounting a clamping collar on the third adhesive tape.

10. The method as claimed in claim 9, wherein the third adhesive tape is fastened to the outer face of an end of the sheath so as to completely cover the end of the sheath and to cover a part of the cable harness that is not provided with the sheath.

11. The method as claimed in claim 9, wherein at least one of the steps of fitting the first sheath stop and fitting the second sheath stop comprises fastening an end of the sheath with the aid of a second adhesive tape, at a given distance from the outer end position in a direction toward the sheath, at a position referred to as the inner end position of the sheath stop.

12. A method for fitting a sheath on a cable harness, the method comprising:
   determining a predetermined length of the sheath to be used;
   mounting the sheath on a mounting tool of tubular shape;
   inserting the cable harness into the mounting tool;
   removing the mounting tool and arranging the sheath around the cable harness;
   fitting a first sheath stop at one end of the sheath, said first sheath stop fastening a first end of the sheath to the cable harness;
   stretching the sheath over the cable harness so as to extend the sheath and tension the sheath; and
   fitting a second sheath stop at a second end of the sheath, wherein at least one of the fitting the first sheath stop& and the fitting the second sheath stop& comprises:
      defining a position referred to as an outer end position of a corresponding one of the first sheath stop and the second sheath stop and fastening a first adhesive tape at the outer end position;
      unfurling the sheath in a tensioned manner as far as the first adhesive tape and fastening the sheath to the first adhesive tape comprising two adhesive faces;
      fastening a third adhesive tape to an outer face of the sheath longitudinally at the outer end position; and
      mounting a clamping collar on the third adhesive tape.

13. The method as claimed in claim 12, wherein the third adhesive tape is fastened to the outer face of an end of the sheath so as to completely cover the end of the sheath and to cover a part of the cable harness that is not provided with the sheath.

14. The method as claimed in claim 12, wherein at least one of the steps of fitting the first sheath stop and fitting the second sheath stop comprises fastening an end of the sheath with the aid of a second adhesive tape, at a given distance from the outer end position in a direction toward the sheath, at a position referred to as the inner end position of the sheath stop.

15. The method as claimed in claim 12, wherein the determining the length of sheath comprises determining the length C of sheath to be used, with the aid of the following expression:

$$C = A \times (B + 2L)$$

in which:
   A is a length of sheath covering one meter of cable harness, said length A depending at least on a diameter of the cable harness and on the type of sheath;

B represents a length of cable harness to be covered; and

L is an additional length corresponding to the length of the one of the first and second sheath stops.

16. The method as claimed in claim 12, wherein the mounting tool comprises a rigid tube having a diameter greater than a diameter of the cable harness.

17. The method as claimed in claim 12, further comprising fastening at least one outer protective sleeve, the outer protective sleeve wrapping around a longitudinal portion of the assembly formed by the cable harness and the sheath.

* * * * *